(12) United States Patent
Ge et al.

(10) Patent No.: US 12,564,816 B2
(45) Date of Patent: Mar. 3, 2026

---

(54) HYDROPHILIC MEMBRANES

(71) Applicant: Merck Millipore Ltd., Carrigtwohill (IE)

(72) Inventors: Jijun Ge, Burlington, MA (US); Xiaozhu Zhou, Burlington, MA (US); Gabriel Tkacik, Burlington, MA (US)

(73) Assignee: Merck Millipore Ltd., Carrigtwohill (IE)

( * ) Notice: Subject to any disclaimer, the term of this patent is extended or adjusted under 35 U.S.C. 154(b) by 511 days.

(21) Appl. No.: 17/778,663

(22) PCT Filed: Nov. 18, 2020

(86) PCT No.: PCT/US2020/061046
§ 371 (c)(1),
(2) Date: May 20, 2022

(87) PCT Pub. No.: WO2021/101987
PCT Pub. Date: May 27, 2021

(65) Prior Publication Data
US 2023/0017950 A1      Jan. 19, 2023

Related U.S. Application Data

(60) Provisional application No. 62/938,424, filed on Nov. 21, 2019.

(51) Int. Cl.
*B01D 61/14* (2006.01)
*B01D 67/00* (2006.01)
(Continued)

(52) U.S. Cl.
CPC ....... *B01D 67/0013* (2013.01); *B01D 61/145* (2013.01); *B01D 61/147* (2013.01);
(Continued)

(58) Field of Classification Search
CPC .... B01D 61/145; B01D 61/147; B01D 71/62; B01D 71/68; B01D 2323/30; B01D 2325/36
See application file for complete search history.

(56) References Cited

U.S. PATENT DOCUMENTS 3,853,601 A     12/1974  Taskier
4,203,847 A      5/1980  Grandine
(Continued)

FOREIGN PATENT DOCUMENTS

EP      0152551 A1     8/1985
EP      0 663 235 A1   7/1995
(Continued)

OTHER PUBLICATIONS

International Search Report and Written Opinion for corresponding Application No. PCT/US2020/061046 (mailed Feb. 17, 2021).
(Continued)

*Primary Examiner* — Bradley R Spies
(74) *Attorney, Agent, or Firm* — EMD Millipore Corporation

(57)      ABSTRACT

The present application relates to an unsupported, permanently hydrophilic filtration membrane, and its method of formation. The membrane comprises a polymeric matrix material and a cross-linked polyoxazoline hydrophilic additive blended throughout said matrix material.

17 Claims, 3 Drawing Sheets

(51) Int. Cl.
| | |
|---|---|
| *B01D 69/02* | (2006.01) |
| *B01D 71/62* | (2006.01) |
| *B01D 71/68* | (2006.01) |

(52) U.S. Cl.
CPC ...... *B01D 67/0009* (2013.01); *B01D 67/0011* (2013.01); *B01D 67/009* (2013.01); *B01D 69/02* (2013.01); *B01D 71/62* (2013.01); *B01D 71/68* (2013.01); *B01D 2323/30* (2013.01); *B01D 2323/34* (2013.01); *B01D 2323/60* (2022.08); *B01D 2325/022* (2013.01); *B01D 2325/04* (2013.01); *B01D 2325/24* (2013.01); *B01D 2325/36* (2013.01)

(56) References Cited

U.S. PATENT DOCUMENTS

| | | | |
|---|---|---|---|
| 4,261,834 A | 4/1981 | Dewinter |
| 4,290,987 A | 9/1981 | Soehngen et al. |
| 4,298,666 A | 11/1981 | Taskier |
| 4,340,479 A | 7/1982 | Pall |
| 4,501,793 A | 2/1985 | Sarada |
| 4,629,563 A | 12/1986 | Wrasidlo |
| 4,698,388 A | 10/1987 | Ohmura et al. |
| 4,798,847 A | 1/1989 | Roesink et al. |
| 4,900,449 A | 2/1990 | Kraus et al. |
| 4,933,081 A | 6/1990 | Sasaki et al. |
| 4,944,879 A | 7/1990 | Steuck |
| 5,178,765 A | 1/1993 | Hu et al. |
| 5,444,097 A | 8/1995 | Tkacik |
| 5,620,790 A | 4/1997 | Holzki et al. |
| 5,736,044 A | 4/1998 | Proulx et al. |
| 6,347,711 B1 | 2/2002 | Goebel et al. |

| | | | |
|---|---|---|---|
| 7,208,200 B2 | 4/2007 | Kools | |
| 7,842,214 B2 | 11/2010 | Romdhane et al. | |
| 8,123,992 B2 | 2/2012 | Kools | |
| 9,045,602 B2 | 6/2015 | Thom et al. | |
| 2003/0148017 A1 | 8/2003 | Tuominen et al. | |
| 2011/0244215 A1 | 10/2011 | Thom et al. | |
| 2013/0146539 A1 | 6/2013 | Larue et al. | |
| 2015/0041386 A1* | 2/2015 | Hansmann | B01D 69/02 156/60 |
| 2015/0190760 A1 | 7/2015 | Singh et al. | |
| 2016/0053064 A1 | 2/2016 | Heidenreich et al. | |

FOREIGN PATENT DOCUMENTS

| | | |
|---|---|---|
| GB | 2122101 A | 1/1984 |
| JP | H7-051555 | 2/1995 |
| JP | H0-7502451 A | 3/1995 |
| JP | 2001-89593 A | 4/2001 |
| JP | 2013-126658 A | 6/2013 |
| JP | 2015-515376 A | 5/2015 |
| JP | 2016-43351 A | 4/2016 |
| KR | 20090126796 A | 12/2009 |
| WO | 93/05871 A1 | 4/1993 |
| WO | 2010/081511 A1 | 7/2010 |
| WO | 2013/159855 | 10/2013 |

OTHER PUBLICATIONS

Koros, et al., "Terminology for membranes and membrane processes", International Union of Pure and Applied Chemistry (IUPAC),, Pure & Applied Chemistry, vol. 68, No. 7, 1996, pp. 1479-1489.
Wijmans, et al., "The mechanism of formation of microporous or skinned membranes produced by immersion precipitation", Journal of Membrane Science, vol. 14, Issue 3, 1983, pp. 263-274.

* cited by examiner

HYDROPHILIC MEMBRANES

This application is a national stage application under 35 U.S.C. § 371 of International Application No. PCT/US2020/061046, filed Nov. 18, 2020, which claims the priority benefit of U.S. Provisional Patent Application Ser. No. 62/938,424, filed Nov. 21, 2019, which is are hereby incorporated by reference in its their entirety.

FIELD

The present application relates to a permanently hydrophilic filtration membrane comprising a polymeric matrix material and a crosslinked polyoxazoline hydrophilic additive blended throughout said matrix material.

BACKGROUND

In many applications of filtration technology, it is desirable to utilize a membrane filter which is mechanically strong, thermally stable, relatively inert chemically, and is insoluble in most organic solvents. Often, membrane surface properties can differ from the bulk properties of the membrane. The desirable surface properties include good wettability, low protein adsorbing tendency, controlled ion exchange capacity and controlled surface chemical reactivity.

One conventional methodology presently used to achieve the duality of function of the surface properties is to coat a pre-formed membrane with an oligomer or polymer having the desired surface properties. Typical coating materials include surfactants and water soluble polymers such as polyvinylpyrrolidone (PVP). However, this approach has disadvantages. Simply impregnating the membrane with a solution, of e.g., a hydrophilic polymer (to hydrophilize a hydrophobic polymeric membrane) is not desirable, since this hydrophilic polymer is readily washed off the membrane.

To improve the surface properties of membrane filters, different methods have been developed over recent decades to permanently modify the membrane surfaces.

U.S. Pat. No. 4,698,388, to Ohmura, et al., discloses the use of polymeric materials coatable with a block copolymer. They are synthesized in the presence of a polymeric peroxide from two varieties of vinyl monomers. The polymer of one of the two varieties of vinyl monomers is homogeneously dispersible in the polymeric materials and the other variety forms hydrophilic homopolymers. The durability of the hydrophilic modification, characterized by the antistatic properties or the electrical surface resistivity, is only tested under mild conditions, i.e., by rinsing with city water at room temperature for two hours. Nothing else is said about the permanence of the hydrophilic modification on the polymeric material.

U.S. Patent Application Publication No. 2003/148017 to Tuominen, et al., discloses the modification of hydrophobic dialysis membranes based on poly(ether) sulfone by the adsorption of copolymers having hydrophobic polypropylene oxide (PPO) segments, and having hydrophilic polyethylene oxide (PEO) segments. The washoff of the copolymers from the membrane into the dialyzate solution is unconcerning in hemodialysis, but is undesirable in the life science industry.

Although there are earlier patents about polyethersulfone (PES)/poly(2-ethyl-2-oxazoline) (PEOX) membranes (e.g., U.S. Pat. No. 4,900,449 to Kraus et al.) and PES/PVP/PEOX membrane (e.g., U.S. Pat. No. 5,178,765 to Hu et al.), they do not mention the further crosslinking of PEOX using an electron beam (e-Beam) to make a permanently hydrophilic membrane. In addition, there is no discussion on how to decrease the extractables/leachables.

U.S. Pat. No. 9,045,602 to Thom, et al., discloses a method of inducing hydrophilicity on membranes. It is focus on modification of the surface of membranes. This process includes impregnating a microporous membrane with a solution including a solvent and a polymer dissolved or dispersed therein, to produce an impregnated membrane. The impregnated membrane is then irradiated with electron beam radiation to produce a microporous membrane on whose surface is fixed, via crosslinking, the polymer of the impregnating solution.

U.S. Pat. No. 4,798,847 to Roesink, et al. discloses a method of making a hydrophilic membrane. The method includes blending a hydrophilic polymer with a hydrophobic polymer and crosslinking the hydrophilic polymer. This method requires the blended membrane to be converted into a non-swollen state prior to the crosslinking reaction.

The present application is directed to overcoming these and other deficiencies in the art.

SUMMARY

The present application relates to an unsupported, permanently hydrophilic filtration membrane comprising: a polymeric matrix material and a cross-linked polyoxazoline hydrophilic additive blended throughout said matrix material.

A second aspect of the present application relates to a filtration cartridge including a housing, and a membrane of the present application positioned within the housing.

A further aspect of the present application relates to a process of forming a permanently hydrophilic filtration membrane. This process involves providing one or more casting solutions of a polymer comprising polyoxazoline and a solvent for said polymer. The casting solution or solutions is then simultaneously or sequentially applied onto a support to form a liquid sheet. In the liquid sheet, a phase separation of the casting solution or solutions is effected to form a membrane. The membrane is immersed in water or an aqueous solution. The wet membrane is treated with an electron beam to crosslink the polyoxazoline, and the permanently hydrophilic filtration membrane is separated from the support.

The resultant membrane of the present application, made with this new process, provides significant improvements in membrane hydrophilicity and its stability.

The hydrophilic membrane is made permanently hydrophilic by crosslinking the polyoxazoline throughout the membrane by treatment with an e-Beam. The e-Beam modification results in permanent hydrophilicity and low extractables/leachables.

DETAILED DESCRIPTION

Figure 1:
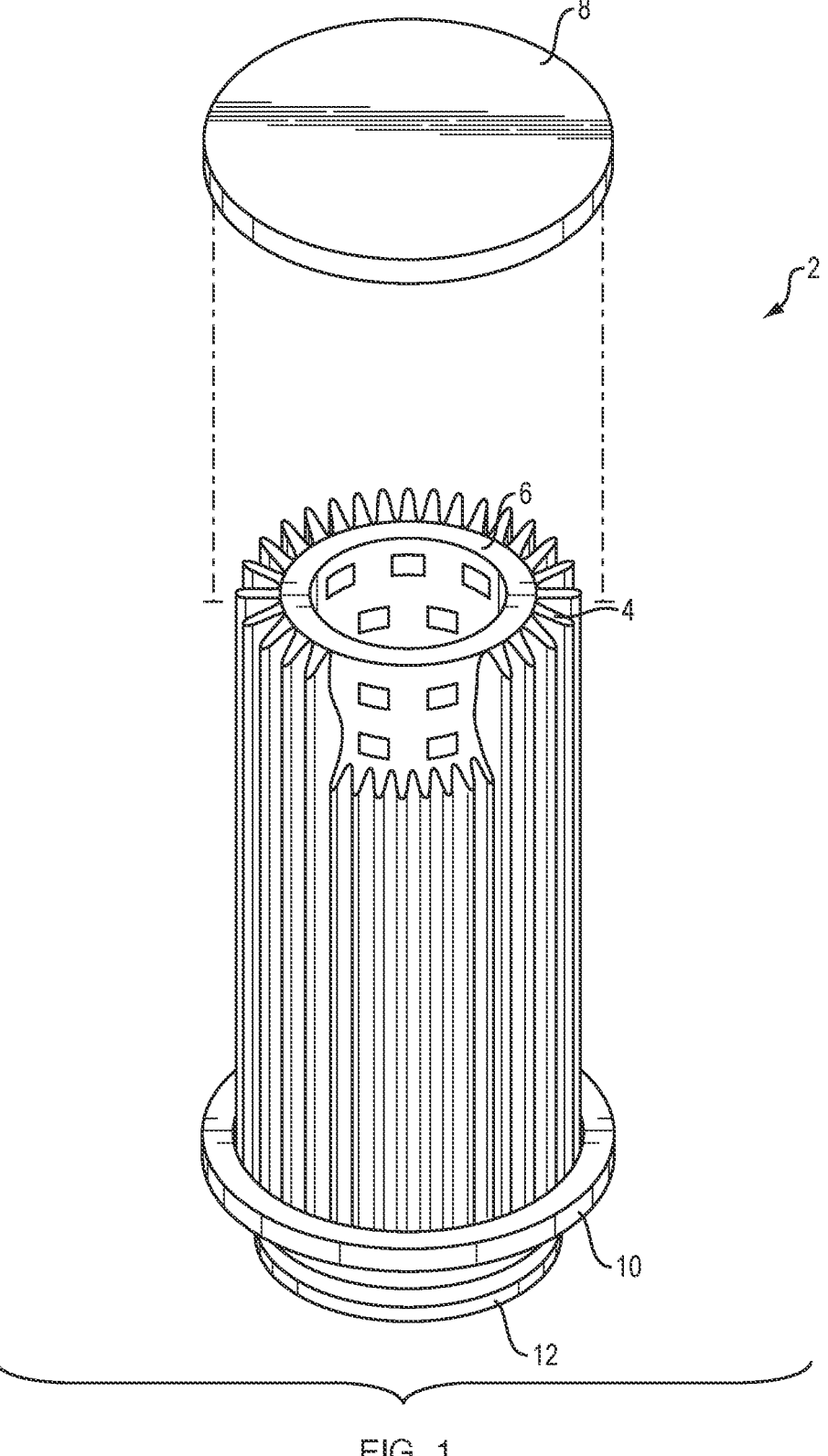
FIG. 1 is a perspective view in partial cross section of an exemplary filter cartridge of the present application.

The present application relates to an unsupported, permanently hydrophilic filtration membrane comprising: a polymeric matrix material and a cross-linked polyoxazoline hydrophilic additive blended throughout said matrix material.

Membranes can be classified as hydrophilic or hydrophobic. When the hydrophilic membranes are brought into contact with water, they will spontaneously wet—i.e. water will displace the air from the pores of the membrane structure without the application of any external force. On the other hand, a positive pressure is required for water to enter the pores of hydrophobic membrane structure to displace the air.

Wet time is used to characterize a membranes wettability in water. The wet time can be determined by adding a drop of 10% NaCl solution to the membrane surface and measuring the time in seconds for the membrane to wet through. This can be observed visually by the membrane becoming clear as it wets through.

The permanently hydrophilic filtration membrane of the present application can be a microporous membrane, or an ultrafiltration membrane Ultrafiltration and microporous membranes are used in a pressure-driven filtration processes. Practitioners in the field of separation processes using membranes easily differentiate between microporous and ultrafiltration membranes, and generally distinguish between them based on their application and aspects of their structure. Microporous and ultrafiltration membranes are made, sold and used as separate and distinct products. Despite some overlap in nomenclature, they are separate entities and are treated as such in the commercial world.

Ultrafiltration membranes are primarily used to concentrate or diafilter soluble macromolecules such as proteins, DNA, starches and natural or synthetic polymers. In the majority of uses, ultrafiltration is accomplished in the tangential flow filtration (TFF) mode, where the feed liquid is passed across the membrane surface and those molecules smaller than the pore size of the membrane pass through (filtrate) and the rest (retentate) remains on the first side of the membrane. As fluid also passes through, there is a need to recycle or add to the retentate flow in order to maintain an efficient TFF operation. One advantage of using a TFF approach is that as the fluid constantly sweeps across the face of the membrane it tends to reduce fouling and polarization of the solutes at and near the membrane surface leading to longer life of the membrane.

Microporous membranes are primarily used to remove particles, such as solids, bacteria, and gels, from a liquid or gas stream in dead-end filtration mode. Dead-end filtration refers to filtration where the entire fluid stream being filtered goes through the filter with no recycle or retentate flow. Whatever material doesn't pass through the filter is left on its upper surface.

With respect to the present application, ultrafiltration membranes as compared to microporous membranes are defined based on the International Union of Pure and Applied Chemistry (IUPAC), "Terminology for Membranes and Membrane Processes" published in *Pure Appl. Chem.,* 68: 1479 (1996), which is hereby incorporated by reference in its entirety. Microfiltration is a pressure-driven membrane-based separation process in which particles and dissolved macromolecules larger than 0.1 µm are rejected. Ultrafiltration is a pressure-driven membrane-based separation process in which particles and dissolved macromolecules smaller than 0.1 µm and larger than about 2 nm are rejected.

The permanently hydrophilic filtration membrane of the present application may be symmetric, or asymmetric.

As used herein, "symmetric" refers to a membrane or zone having an approximately uniform pore size distribution throughout the membrane or zone.

As used herein, "asymmetric" refers to a membrane or zone where the pores have diameters which vary continuously or discontinuously in the direction of the thickness of the membrane or zone.

In this application, a "layer" of membrane is defined as an independent, membrane sheet. One or more layers of membrane can be used in a filter to remove particles.

In this application, a "zone" is within a layer of membrane having a physical characteristic which is different from surrounding or neighboring zones. A layer of membrane can comprise one, two, three, or even more zones. One or more membrane layers with multiple zones can be used in a filter to remove particles of different sizes.

Likewise, the term "integral" means a structure that although formed of multiple zones and often different polymeric materials, that is bonded together so that it behaves as one structure and does not delaminate or separate in normal use.

The "throughput" of a filter is defined as the amount of fluid that can be processed by a filter until a filtration end point is reached. This endpoint can be based on the maximum processing time to filter a batch or, in the case of constant pressure operation, the minimum filter flux relative to the initial clean water flux. In this application, a filter's throughput is defined as the maximum volume of fluid that could be filtered through a filter. Since filter throughput is determined by the membrane used, the throughput of a membrane is usually measured to predict the filter throughput. In the case of constant pressure operation, the volume of fluid filtered per area of membrane is the membrane throughput. The maximum volume filtered at 90% of initial flux of the membrane is called V90, with the units often expressed as liter per square meter ($L/m^2$). Filter or membrane throughput is often interchangeable with filter or membrane capacity.

Historically, asymmetric membranes were developed to gain high flux, which leads to improved throughput when compared to symmetric membranes. See U.S. Pat. No. 4,261,834 to deWinter, which is hereby incorporated by reference in its entirety. The most common asymmetric membrane has a gradient structure, in which the pore size gradually and continually increases from one surface to the other. See U.S. Pat. No. 4,629,563 to Wrasidlo, which is hereby incorporated by reference in its entirety. The other type of asymmetric membrane structure has a retentive zone inside the asymmetric membrane, where the pore size decreases and then increases again. See U.S. Pat. No. 4,933,081 to Sasaki, et al, which is hereby incorporated by reference in its entirety. The benefits of the "hour-glass" type of asymmetric membrane include high flow rates and a reduced risk of retention degradation due to surface scratches.

The permanently hydrophilic filtration membrane of the present application can have one or more distinct zones. For example, the membrane may have three distinct zones.

In general, membranes with multizone structures are scientifically more attractive since each zone can be fine-tuned to achieve an overall improved performance. A multizone microfiltration membrane comprising at least one retentive symmetric zone and at least one pre-filtration zone was first patented using sequential casting. See U.S. Pat. No. 5,620,790 to Holzki, et al, which is hereby incorporated by reference in its entirety. As stated in U.S. Pat. No. 7,208,200 to Kools, which is hereby incorporated by reference in its entirety, sequential casting may likely create a clear demarcation line or region with dense and skin-like structure between the retentive symmetric zone and pre-filtration zone. This will likely lead to a drastic decline in the membrane's throughput due to particle accumulation at the interface. Moreover, the symmetric mid zone morphology, as stated in U.S. Pat. No. 5,620,790 to Holzki, limits its own contribution to resultant membrane throughput. U.S. Pat. No. 7,208,200 to Kools, which is hereby incorporated by reference in its entirety, discloses a co-cast process that smoothes the layer to layer transition, and thus lead to improved performance.

The membrane structure in each distinct zone is precisely tailored by applying different mix formulations per the membrane performance requirements. Furthermore, each zone can have its own characteristic morphology; there is no distinct interface zone in-between any two adjacent casting zones. The membrane morphology can be transformed based on different casting formulations and process conditions.

In a further embodiment of the present application, the membrane has a total thickness of 65-300 μm.

The membranes of the present application may have a polymeric matrix material of one or more polymers independently selected from the group consisting of PVDF, polyamides, polyimides, polyether sulphones, polysulphones, polyaryl sulphones, cellulose, regenerated cellulose, cellulose esters, polyetherimides, acrylic polymers, methacrylic polymers, and copolymers of acrylic and methacrylic polymers. Preferably, the membrane of the present application includes polyether sulfone and poly (2-ethyl-2-oxazoline).

The term "polymer" as used herein is meant to include polymeric compositions formed from one or more monomers. Representative suitable polymers forming the porous membrane include polyolefins such as polyethylene, polypropylene, polymethylpentene, or the like; polystyrene or substituted polystyrenes; fluorinated polymers including poly(tetra fluorethylene), polyvinylidene fluoride or the like; polysulfones such as polysulfone, polyethersulfone or the like; polyesters including polyethylene terephthalate, polybutylene terephthalate or the like; polyamides including poly (hexamethylene adipamide), poly (phenylene terephthalamide) or the like; polyacrylates and polycarbonates; vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like.

In a further embodiment of the permanently hydrophilic filtration membrane of the present application, the polyoxazoline is selected from the group consisting of poly (2-ethyl2-oxazoline), poly(2-methyl-2-oxazoline), and poly(2-propyl-2-oxazoline). In a more specific embodiment of the membrane of the present application, the polyoxazoline is poly (2-ethyl-2-oxazoline).

The hydrophilic membrane of the present application can be made using an additional hydrophilic polymer or polymers in the casting solution. Examples of hydrophilic polymers are polyacrylic acid, polyvinylalcohol, polyvinyl acetate, polyvinylpyrrolidone, polyethyleneglycol, polyvinylpyridine, polyethyleneimine, polyoxazoline, and the like.

In one embodiment, an electron beam (e-Beam) is used to crosslink the polymers, for example by methods described in U.S. Pat. No. 4,944,879, which is hereby incorporated by reference in its entirety. Typically, a web or individual sample is passed through a curtain of electrons generated by an electron beam processor. The processor delivers the desired dose at an accelerating voltage ranging from 100 kV to 200 kV. The typical dose range is from 20 kGy (kiloGray) to about 150 kGy.

In a further embodiment of the membrane of the present application, the polyoxazoline may be cross-linked by electron beam with a dose of from about 20 to 150 kGy.

Organic extractables are generally measured as total organic carbon (TOC). In an embodiment of all aspects of the present application, the membranes extractable total organic carbon is less than 20 μgC/cm$^2$, or less than 10 μgC/cm$^2$.

The polymer casting solutions of the present application typically include at least one polymer and at least one solvent for the polymer or polymers. The casting solution may contain one or more components that are poor solvents or non-solvents for the polymer or polymers. Such components are sometimes called "porogens" in the art. The mixes are preferably homogeneous. They can optionally contain one or more components, which are non-solvents for the polymer. The casting solution can either be stable over time (which achieves good solvent quality) or be meta-stable over time. This casting solution also can potentially have a lower critical solution temperature or an upper critical solution temperature. Solvents that are used include dimethyl formamide, N,N-dimethylacetamide, N-methyl pyrrolidone, tetramethylurea, acetone, or dimethylsulfoxide. A myriad of porogens have been used in the art, including formamide, various alcohols, and polyhydric compounds like water, various polyethylene glycols, and various salts, such as calcium chloride and lithium chloride.

Examples of other additives include surfactants to further improve wettability, and polymers compatible with the primary membrane polymer used to modify mechanical properties of the final membrane.

Examples of surfactants used in the creation of microporous membranes can be found in U.S. Pat. No. 4,290,987 to Soehngen, et al., U.S. Pat. No. 4,298,666 to Taskier, and U.S. Pat. No. 4,501,793 to Sarada, which are hereby incorporated by reference in their entirety. Surfactants, as commonly known in the art, can be coated on to membranes. One such example of this is disclosed in U.S. Pat. No. 3,853,601 to Taskier, which is hereby incorporated by reference in its entirety. The disclosed polyolefinic microporous films, such as polypropylene microporous films, are treated with a silicon glycol copolymeric surfactant. The microporous film may be impregnated with a combination of a silicon glycol copolymeric surfactant and a cationic imidazoline tertiary amine. The surfactants are applied to the polyolefinic microporous films by contacting the film with a dilute solution of from about 1 to 10% by weight of the surfactant and/or surfactants in an organic solvent such as acetone, methanol, ethanol, or isopropyl in order to produce an "add-on" of the surfactant to the microporous film of from about 2 to about 20% by weight, based on the weight of the uncoated microporous film.

U.S. Pat. No. 4,501,793 to Sarada, which is hereby incorporated by reference in its entirety, discloses the use of alkylphenoxy poly(ethyleneoxy) ethanol surfactants. The surfactants used possess an HLB (Hydrophilic Lipophilic Balance) of from about 10 to 15. Such surfactants are well known to those skilled in the art, and are readily commercially available. Suitable surfactants include, for example, the 500 and 600 series compounds sold under the tradename Igepal® by the GAF Corporation, such as Igepal RC-520, RC-620, RC-630, CO-520, CO-530, CO-610, CO-630, CO-660, CO-720, CA-520, CA-620 and CA-630. Pluronic surfactants can also be added to increase the membrane hydrophilicity.

When comparing the properties of filtration membranes, fluid permeability and bubble point are most often used. As used herein, "permeability" is defined as the bulk velocity of the fluid flowing through the membrane at a unit pressure difference across the porous structure, commonly measured in liter/(m$^2 \cdot$hr$\cdot$psi). The most common fluids used to measure permeability are air and water.

As used herein, "bubble point" is defined as the pressure of gas that is required to displace a liquid from the largest pore of the porous structure. The sample of the material to be tested is soaked in a liquid that spontaneously fills the pores in the sample. Gas under pressure is then applied on one side of the sample. Initially, the gas does not flow through the sample because the pores in the sample are filled with the liquid. However, when the gas pressure is increased, the gas empties the largest pores of liquid at a certain level of pressure and gas begins to flow through the sample. The pressure at which the gas starts to flow through the sample is known as the bubble point pressure.

The relation between the size of a fluid-wet cylindrical pore and the air pressure required to empty it (P, the bubble pressure for that cylindrical pore) is:

$$D=4\gamma \cos \theta/P$$

where D is the diameter of the pore, θ is the contact angle, and γ is the surface tension of the wetting liquid. When measured bubble pressure can be empirically correlated to the size of real membrane pores, it provides readily obtained estimates of the sizes of real, noncylindrical pores.

The bubble point of the membrane was measured using a Capillary Flow Porometer (Model no: CFP-1200AEX) made by Porous Materials, Inc. The test liquid used for the bubble point measurements was isopropanol.

The breaking strain is defined as the ratio of the extension of the membrane to its original length at the point when the membrane is broken under stress. The breaking strain of the membranes was tested using a Zwick/Roell Z2.5 machine. Test samples with size of 1 inch by 4.5 inches were precut from left (L), center (C), and right (R) locations of 10″ wide membrane rolls. The left and right samples were taken from locations 1 inch away from the edge of the membrane. Test samples were loaded to the Zwick machine and then stretched under stress. The stress and strain curves were recorded until the breaking point. The reported values are the average of the test results of the L, C, and R samples. In a further embodiment of all aspects of the present application, the membrane has a breaking strain of at least 20, at least 25%, or at least 30%.

In a further embodiment of the present application, the membrane is capable of being pleated without degradation of membrane retentive performance. In a more specific example of all aspects of the present application, the membrane is pleated.

As used herein, the term "pleat" or "pleated" is intended to include all such cross-sectional shapes. Relative to occupied volume, the pleated structure presents to an incoming fluid process flow more surface area than that which would be presented by use of flat sheet. This is of particular advantage in consideration of the desire to maximize device throughput.

The pleats of the membrane can be configured in a corrugated shape or spirally positioned and can have a loop-shaped cross-section or a folded cross-section, such as a W-shaped or M-shaped cross-section. The pleated membrane is typically wrapped along a vertical axis and the ends of the pleated membrane are sealed to each other to form a tubular structure or a filter tube. In another embodiment, the pleated membrane is sealed as a flat corrugated filter in a frame sealed to its outer peripheral edges. In all embodiments, the pleated membrane is designed such that liquid or gas must pass through the membrane in order to pass downstream of the membrane.

The retentive properties of the membrane can be tested using the ASTM F838-15 Bacterial Retention Testing method. In this testing, worst-case processing conditions are used to determine the ability of a sterilizing-grade filter to retain a minimum challenge of 10$^7$ cells of *Brevundimonas diminuta* (*B. diminuta*) per cm$^2$ of filter area. Size controls are run with each test to prove that the test organism is the appropriate size. For devices made with a 0.2 μm pore size rated membrane, it is important that the device is fully retentive when challenged with a *B. Diminuta* solution. If the membrane is weak enough, cracks can be formed during the membrane pleating process. Consequently, a high diffusion rate will be observed in the device and the device will not be fully retentive. Because of the formation of cracks from pleating, the probability of microorganisms such as *B. diminuta* passing through the cracks increases, thus causing the reduction in retention, the so-called "degradation" of the membrane retentive properties.

A second aspect of the present application relates to a filtration cartridge including a housing, and a membrane of the present application positioned within the housing. The filtration cartridge can include a membrane of the present application in the form of a filter tube. In one embodiment of the present application, the membrane of the filter cartridge is pleated. In another embodiment, the filter is spiral wound in one or more layers, with or without spacers between them. Furthermore, the cartridge can contain greater than 0.11 m$^2$ of effective membrane area per inch of housing height.

One example of a filter cartridge of the present application is shown in FIG. 1. Filter cartridge 2 of FIG. 1 includes pleated high throughput membrane of the present application 4, which surrounds a porous hollow core 6 and is provided with a sealing cap 8 and a second cap 10 having an outlet 12. Optionally, an outer porous protective cage is spaced from and surrounds the outer surface of the membrane. Preferably the cage is sealed to sealing cap 8 and second cap 10 to form an integral cartridge filter. The cage if used, maintains the membrane in a relatively fixed tubular conformation. The cage can be made of rigid materials and have uniformly dispersed holes to allow the inward flow of fluid from regions peripheral to the pleated filter tube, through the membrane, into core 6, and then ultimately out of the second end cap 10 via the outlet 12.

For further details regarding the construction and functions of a replaceable filter cartridge are provided by U.S. Pat. No. 5,736,044, to Proulx, et al. The pleated filter element can be utilized alone or with a pre-filter. The pre-filter may be positioned within the housing adjacent the fluid inlet or it may be applied to the cartridge adjacent the outer surface of the membrane.

Filter cartridges typically include a porous filtration element located within a structural housing. In such filters, unfiltered fluid enters the housing through an inlet port and passes through the filtration element, which removes contaminants or other impurities from the fluid. The filtered fluid is discharged through an outlet port. Filter cartridges include so-called "quick change" cartridges that typically have the inlet and outlet combined in a single port at one end of the housing and in-line cartridges in which the inlet and outlet ports are located at opposite ends of the housing. Because the fluid flow is often pressurized, these ports are typically sealed, such as with an O-ring or the like. It is therefore desirable to provide small ports because larger openings are more difficult to seal (the larger the seal, the larger the force it is subjected to for a given pressure).

The housing may be constructed as one-piece, or as two or more components that are structurally attached together into an assembly. The use of a one-piece housing enables a cost reduction relative to a multi-piece assembly. A polymeric one-piece housing can be fabricated by any suitable process including blow molding or injection molding with gas or water assist. Blow molding is generally faster and less expensive than injection molding. Blow molding also stretches and aligns the polymer chains and produces stronger and tougher resultant material properties as compared to injection molding. Either process can produce a hollow container with an interior that has a larger dimension than the throat or port sizes desired at the connection end, much like a plastic bottle. Alternatively, the housing can be metallic and fabricated by a casting method or spin forming. And while a one-piece construction provides cost benefits, the housing could alternatively be produced as a two (or more) piece assembly of parts formed by injection molding or casting.

Figure 2:
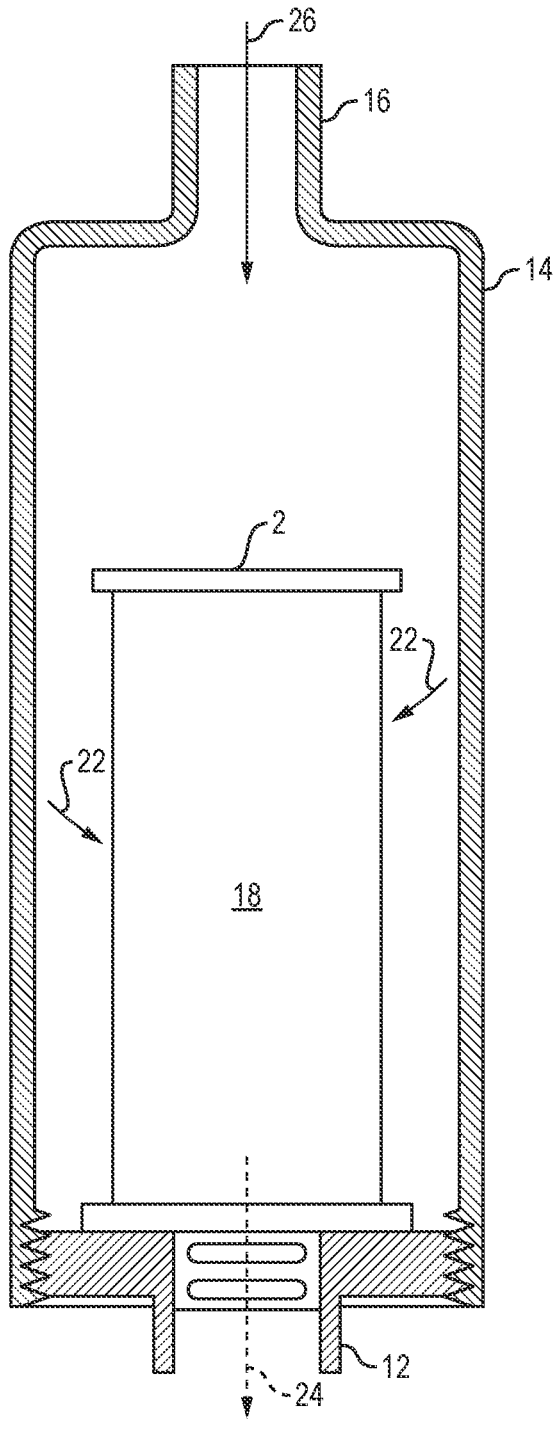
FIG. 2 is a perspective view in cross section of an exemplary filter cartridge of the present application positioned within a housing during use.

The filter tube, preferably pleated, is composed of at least one layer of the high throughput membrane of the present application. Preferably, the membrane is oriented such that fluid introduced into said housing through the fluid inlet commences passage through the asymmetric membrane through its open-side. FIG. 2 shows one such design. The cartridge 2 is positioned in housing 14. A fluid to be filtered, be it liquid or gas, enters the first or inlet port 16 into the interior of housing 14 as indicated by arrow 26. The fluid passes through the outer surface 18 of the cartridge 2 as indicated by arrows 20 and 22 to the core and out the second port 12 or outlet of housing 14 as indicated by arrow 24. If desired the flow of fluid may be the opposite of that described above, with second port 12 acting as the inlet and first port 16, acting as the outlet. Fluid can flow from second port 12, through the core and the membrane, past outer surface 18 of cartridge 2 to the interior of the housing 14 and out through the first port 16.

A further aspect of the present application relates to a process of forming a permanently hydrophilic filtration membrane. This process involves providing one or more casting solutions of a polymer comprising polyoxazoline and a solvent for said polymer. The casting solution or solutions is then simultaneously or sequentially applied onto a support to form a liquid sheet. In the liquid sheet, a phase separation of the casting solution or solutions is effected to form a membrane. The membrane is immersed in water or an aqueous solution. The wet membrane is treated with an electron beam to crosslink the polyoxazoline, and the permanently hydrophilic filtration membrane is separated from the support.

In one embodiment of the process for forming the membrane of the present application, the aqueous solution is selected from a mixture of mixture of water and multifunctional monomer or monomers, including methylene bis-acrylamide, Sartomer 9035, and Tetra(ethylene glycol) diacrylate, etc.

In one embodiment of the method of forming the permanently hydrophilic filtration membrane, the polyoxazoline is selected from the group consisting of poly (2-ethyl-2-oxazoline), poly(2-methyl-2-oxazoline), and poly(2-propyl-2- oxazoline). In a more specific example, the polyoxazoline is poly (2-ethyl-2-oxazoline). The ratio of polyoxazoline to PES in the formulations can range from 5 wt % to 50 wt %, in one example the ratio of polyoxazoline to PES ranges from 8 wt % to 12 wt %. The polyoxazoline of the membrane can be cross-linked by electron beam with a dose from about 20 to 150 kGy.

The casting solutions can further comprise one or more porogens, independently selected from a group consisting of formamide, alcohols, polyhydric compounds, water, polyethylene glycol, calcium chloride, and lithium chloride. In one embodiment of the present application, the casting solutions include polyether sulfone, N-methyl-2-pyrrolidone, triethylene glycol, and poly (2-ethyl-2-oxazoline).

The casting solutions can have an upper critical solution temperature, which will allow a phase separation to be carried out by cooling the casting solutions below their upper critical solution temperature. Alternatively, the casting solutions can have a lower critical solution temperature, which will allow a phase separation to be carried out by heating the casting solutions above their lower critical solution temperature. Additionally, the phase separation can also be carried out by vapor induced phase separation.

The casting of the permanently hydrophilic membrane can be carried out sequentially. Furthermore, the casting can be done simultaneously, such as by co-casting.

In forming multi-zone membranes, one can form the different mixes for the different zones by varying the concentration of polymer, solvent or non-solvent, as well as the viscosity, additives or treatments of the solutions or combinations of any of these to create the desired multi-zone structure.

The selection of a solvent to provide a stable homogeneous solution for casting in the formation of membranes involves basic principles of polymer solubility. Polymer solvents may be categorized as good solvents, nonsolvents, and poor solvents. Good solvents are those in which the interactions (forces) between the polymer molecules and solvent molecules are greater than the forces of attraction between one polymer molecule and another polymer molecule. The reverse is true for nonsolvents. Poor solvents are those in which the interactions between the polymer and solvent are equal to the forces of attraction between one polymer and another polymer molecule.

Generally, one can form the zones of a multi-zone structure from the same polymer and solvent, by varying the concentration of components in the mix, viscosity, additives and treatment (before, during, or after formation). Alternatively, one can use different polymers for the different zones. When using different polymers, one must select polymers that are compatible. Additionally, the solvents and phase separation materials should be the same if possible or at least compatible so that they do not adversely affect the other zone(s).

There are several processes for the preparation of porous polymeric structures. Most common processes are based on phase separation of a polymer solution. In such processes, the composition or temperature of a polymer solution is changed in such a way that it becomes thermodynamically unstable and separates into two phases. One of the phases, containing most of the solvent components, is then removed and the other phase, containing most of the polymer, becomes the porous structure. The types of phase separation processes are usually classified into three categories: 1) vapor-induced phase separation (VIPS), also called "dry casting" or "air casting", 2) liquid-induced phase separation (LIPS), mostly referred to as "immersion casting" or "wet casting", and 3) thermally induced phase separation (TIPS), frequently called "melt casting".

VIPS and LIPS processes rely on mass transfer between the components of the cast polymer solution, or mixes, and the precipitant medium present in vapor or liquid state, respectively. TIPS is controlled by temperature change of the polymer solution. The VIPS process has an inherent disadvantage of low mass transfer rate so that the required residence time in the casting machine is long, resulting in a trade-off between long machines with high capital investment or low process rates. The LIPS process is run at relatively higher rates, since the mass transfer between the polymer solution and a liquid precipitant is higher. While this is an advantage in LIPS processes used to make ultrafiltration and reverse osmosis membranes that require high mass transfer rates to create small pore sizes, it is a complication in processes for making microporous structures which typically require moderate mass transfer rates to allow sufficient growth of the dilute phase leading to higher pore sizes in the microporous range 0.05-10 micrometers. In order to make microporous structures using the LIPS process, several ways of overcoming this complication have been devised in the prior art. Using high content of an organic solvent as described in U.S. Pat. No. 4,203,847 to Grandine and U.S. Pat. No. 4,340,479 to Pall, which are hereby incorporated by reference in their entirety, or a straight organic solvent in the immersion bath is one of the common methods. This principle was well analyzed by Wijmans et al., *J. Membr. Sci.*, 14, 263 (1983), which is hereby incorporated by reference in its entirety. The disadvantage of this technique is the use of large volumes of combustible organic liquid requiring an explosion-proof manufacturing facility and the high cost of solvent disposal.

As taught in U.S. Pat. No. 5,444,097 to Tkacik, which is hereby incorporated by reference in its entirety, the membrane is made from a polymeric mix exhibiting a lower critical solution temperature ("LCST") which was measured by cloud point. Heating the mix above the LCST causes phase separation. This phase separation step is incorporated in the process of present application for the membrane pore size control. The vapor induced phase separation step was incorporated in the present application as well. Dew point and vapor temperature will impact membrane pore forming process and thus pore size can be controlled accordingly.

The process of the present application utilizing a LCST process starts with preparing a homogeneous mix of at least one polymer in a solvent system, said solvent system consisting of at least one component which is a solvent for the polymer, where the homogeneous solution exhibits a lower critical solution temperature. The homogeneous mix may optionally contain one or more components which are non-solvents for said polymer. The mix solution can be prepared by conventional means, mixing together the polymer with the components of the solvent system. Next, the polymeric mix is formed into the desired shape. The shaped mix is then heated until phase separation occurs, marked by cloudiness of the solution. The components of the solvent system are thereafter removed by methods such as evaporation or extraction and the like. The conditions of the removal process may further affect the later stages of phase separation and influence the properties of the polymeric porous structure. A preferred method for removing the components of the solvent system involves immersing the shaped phase-separated polymeric mix in one or more liquid baths comprising at least one non-solvent for the polymer, the non-solvent being miscible with at least one component of the solvent system. The porous polymeric structure may then be optionally subjected to additional extraction or drying.

As taught in U.S. Pat. No. 7,842,214 to Romdhane, et al., which is hereby incorporated by reference in its entirety, vapor induced phase separation (i.e., air casting) generally includes a coagulant (e.g., water vapor) for inducing a phase inversion. The coagulant can be introduced to the polymeric material of the membrane as a vapor. A high concentration of vapor may condense and reduce the thermodynamic stability of the polymeric material dissolved in a solvent. Analogous to a liquid induced phase separation, polymer rich and polymer poor regions are formed from the vapor induced phase inversion, resulting in the formation of a microstructure. Examples of coagulants for vapor induced phase separation include water, alcohols, amides, and combinations thereof.

Contact of the polymer and coagulant vapor at a surface, and the diffusion of a portion of the coagulant into the polymer solution may cause the polymeric material to become thermodynamically unstable. The polymeric material can precipitate from the solvent of the solution forming a microstructure. During phase inversion, regions of the polymer solution layers are rich in polymeric material forming a structure, and some regions are poor in polymeric material forming pores. Membranes may be further subjected to solvent removal and subsequent drying after development of the microstructures.

After the polymer mixes are made, they are applied to a moving carrier. For an unsupported membrane, which does not have a web attached to the final membrane, the carrier is usually a plastic film, such as polyethylene terephthalate, or a polyethylene coated paper, or similar smooth continuous web that can be easily removed from the formed membrane.

In one embodiment of the present application, the membrane is created through a process of slot co-casting. "Co-casting" means that the individual zones are cast essentially simultaneously with each other with substantially no time interval between one cast zone and the next cast zone. Co-casting is an important aspect of the present application, because it allows for formation of controlled pore size regions at the junctions of the zones. In other casting techniques known in the prior art, a well-defined demarcation line is formed between the sequentially cast zones. A drastic change in pore size going from a more open to a more tight structure can lead to undesirable fast accumulation of particles at the interface and/or the formation of a skin layer at the demarcation point and, consequently, a drastic flux decline. Possibly due to partial mixing of adjacent co-cast lacquers or due to high shear forces at the interface between two adjacent co-cast lacquers, a sharp interface can be replaced by a more subtle change in pore size between two adjacent zones. Such an interfacial zone is beneficial for the retentive behavior of the overall structure of the membrane. At the same time, it allows the formation of microporous structure with no discernable demarcation line in the structure.

Application of the polymer mixes can be done by any standard method. The objective is to coat a first mix solution onto the carrier and a second mix solution upon the first, and a third mix solution upon the second. A preferred method is co-casting, which is described in detail in U.S. Pat. No. 8,123,992 to Kools, which is hereby incorporated by reference in its entirety. Co-casting can be done with a triple knife over roll apparatus, a pressurized tri-slot coating bead, or any other pre or post metering coating device as is known in the industry. Co-casting generally allows for formation of controlled pore size regions at the junctions of zones; however, even with the co-cast technique one can, if desired, form a sharp or well-defined demarcation line between zones with the proper selection of materials and application methodologies.

Figure 3:
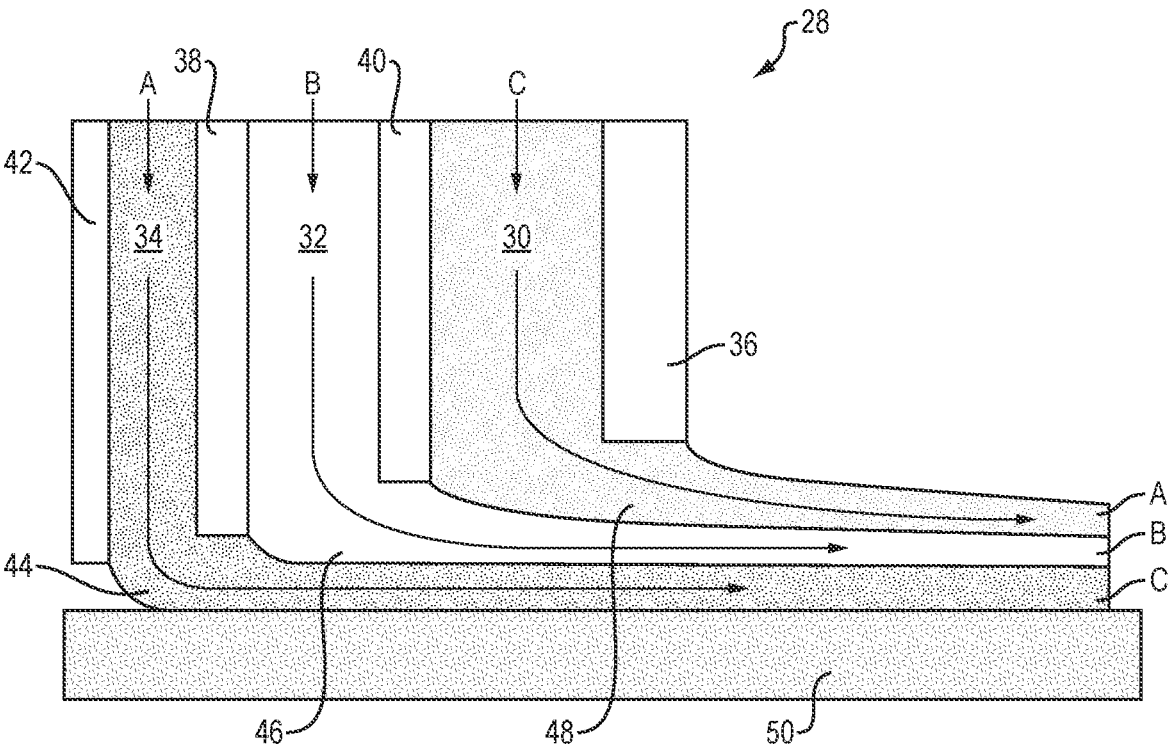
FIG. 3 is a side view of an apparatus useful in effecting the process of making the permanently hydrophilic membrane of the present application.

FIG. 3 illustrates a multiple zone forming apparatus 28 for casting multizone membranes. As shown, apparatus 28 is designed to produce a three-zone liquid film and has three chambers 30, 32 and 34, containing solutions A, B, and C, one for each zone, to be cast. If desired, additional chambers may be added to form additional co-cast zones. The apparatus comprises front wall 36, and back wall 42, with separating walls 38 and 40 between the front and back walls. The separating walls define the volumes of the three chambers. Two side walls complete the apparatus. In operation, the apparatus is fastened onto a typical membrane casting machine, and a support web 50 is moved or passed under the stationary apparatus and the three solutions are dispensed through gaps or outlets 44, 46, and 48. The thickness of the zones is controlled by the distance (gap) set between, the moving web and the outlet, illustrated by gap settings 44, 46, and 48. The final liquid zone thickness is a function of gap distance, solution viscosities, and web speed. The back wall of the apparatus usually is held a small distance above the support to prevent wrinkling or marring the support. Back wall gap, support speed, and solution viscosity are adjusted in practice to prevent solution from leaking out through the back wall gap. The apparatus can be fitted with heating or cooling means for each chamber separately, or for the apparatus as a whole, if necessitated by the solution characteristics, or to further control final membrane properties.

A slot die consists of an enclosed reservoir with an exit slot having a smaller cross-section. An extruder or positive displacement pump, or in some cases a pressurized vessel feeds the coating into the reservoir at a uniform rate, and all of the fluid that goes into the die is forced out from a reservoir through a slot by pressure, and transferred to a moving carrier web. The slot is positioned perpendicular to the moving carrier web. Multiple zone coatings require a die with individual reservoirs, and associated feed method, and exit slots for each zone.

The membranes of the present application can be produced using a premetered coating process. Premetered coatings are those in which the exact amount of coating solution to be deposited is led to the coating head. The height of the zones is set by the deposition rather than by some post application means such as a doctor blade which sets the thickness of the structure after metering of the zones (commonly referred to as "post metering process"). The premetered term is applied to die coating, as well as slide and curtain coating among other methods of forming the structure.

After the zones are coated onto the moving carrier, the nascent membrane is immediately exposed to the environment of a controlled air chamber. Thermal induced phase separation could start by controlled drum temperature and moisture induced phase separation could start due to moisture absorbed from the air chamber. Thereafter, the nascent membrane is immersed into a liquid that is a nonsolvent for the polymer, and miscible with the solvent and porogens. This will cause nonsolvent induced phase separation and, finally, the formation of a porous membrane. One example of a liquid that can be used as a non-solvent for the nascent membrane is water.

The formed composite membrane is then usually separated from the carrier and washed to remove residual solvent and other material. The membrane can then be dried. Water can be used to wash the membrane, and membrane can be dried with vacuum drum drier.

In the coagulation of a multizone liquid sheet, coagulation occurs from the liquid film surface that first contacts the coagulation bath and then through the subsequent zones of the multizone liquid sheet. Each zone dilutes and changes the coagulant as the coagulant diffuses through the zones. Such changes to the nature of the coagulant affect the membrane formation of each zone and of the final multizone membrane. Zone thickness, composition, and location of each zone relative to the other zones will affect membrane structure and properties. Each zone forms differently than it would if it were to be made from a single zone solution or from laminates of single zones.

In another embodiment, the zones are sequentially cast successively on to the prior cast. In sequential casting, the solutions comprising the polymers are typically cast into thin films, one on top of the other, followed by quenching in a non-solvent for the polymers. The first solution is spread in a zone (bottom zone) onto a support (such as a nonporous support), and the second solution is spread in a zone (upper zone) onto the first solution, and so on. The membrane can be later separated from the support after quenching; however, the support (porous or non-porous) can be incorporated into the final structure if desired.

The membranes can be cast manually (e.g., poured, cast, or spread by hand onto a casting surface and quench liquid applied onto the surface) or automatically (e.g., poured or otherwise cast onto a moving bed). There should be a time interval between the casting of the solutions. Preferably, the time interval is about 2 seconds or more. For example, the time interval can be in the range of from about 2 seconds to about 35 seconds, or about 2 seconds to about 10 seconds.

A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot.

The support with the cast solutions thereon is then immersed in a quenching bath to effect phase separation of the polymer solutions. In the quenching bath, precipitation or coagulation occurs from the liquid film surface that first contacts the bath and then through the subsequent zone. After formation, the membrane is typically washed (e.g., in deionized water) to remove residual solvent), and dried.

The permanently hydrophilic membrane of the present application can be used for dead end filtration such as sterile filtration and virus filtration as well as tangential flow filtration, such as ultrafiltration in life science industry. It can also be used in other industrial applications that require separation media.

Without e-Beam crosslinking the PEOX in the hydrophilic membrane made by the process of the present application, the resulting membranes would have high TOC. In addition, the resulting membrane would not have permanent hydrophilicity. The e-Beam crosslinking process makes the hydrophilicity permanent, and reduces TOC, while having no compromise on mechanical properties.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The following Examples are presented to illustrate various aspects of the present application, but are not intended to limit the scope of the claimed application.

EXAMPLES

Materials and Methods

Membrane performances including TOC, flow time, wet time, and breaking strain were tested after the membranes were modified by e-Beam.

E-Beam Modification

The membranes were modified by exposure to electron beam irradiation (EBLab, Comet Technologies) using an accelerating voltage of 200 kV and a dose ranging from around 20 to 150 kGy. The membrane was transported to the e-Beam irradiation chamber at a speed of 3-15 m/min. The e-Beam irradiation chamber was made inert with nitrogen. After e-Beam irradiation, the membranes were cleaned in methanol and water sequentially, and dried before further characterization.

Extractable/Leachable Results

The extractables/leachables in the water were characterized by the amount of TOC (total organic carbon). One 47 mm disk of each membrane sample was die cut and autoclaved at 126° C. for 1 hour, and then soaked in 40 grams of water for 24 hours at ambient temperature. The TOC of the extracted solution was tested using a Model 900 TOC Analyzer made by Sievers. A TOC standard was made using a Potassium Biphthalate, 1000 ppm carbon stock solution and diluting it to 10 ppm carbon with water.

Wet Time

The membrane was baked at 135° C. in air for 2 hours and then cooled to ambient temperature before testing the wetting time. The wet time is determined by wetting the membrane using a 10% NaCl solution according to following procedure. A drop of 10% NaCl solution (30~60 µL) is placed on the surface of the membrane and the time of the wicking of the drop into the membrane is recorded in seconds. The time is measured until the membrane below the NaCl solution drop is completely wet.

Flow Time

After e-Beam treatment, the membranes were dried at 70° C. for 1 hour, and then tested for flow time (the duration of time it takes for 500 ml of water to pass through a 47 mm membrane under the pressure of −25 in·Hg; the flow time is inversely proportional to permeability.

Bubble Point Testing

A 25 mm membrane disk was die cut, and isopropanol (IPA) or Galwick was used as the wetting agent for the membrane bubble point test. The test was done using a Capillary Flow Porometer made by Porous Materials, Inc. (CFP-1200/AEX). The bubble point is inversely proportionally to pore size, and was used to indicate the pore size of the membranes.

Breaking Strain Test

Membrane sample strips with a size of 1 inch by 4.5 inches were cut from left, center and right of a membrane roll and the breaking strain was measured using a Zwick/Roell Z2.5 machine. Test samples were precut from left (L), center (C), and right (R) locations of 10″ wide membrane rolls. The left and right samples were taken from locations 1 inch away from the edge of the membrane. The reported values are the average of the test results of the L, C, and R samples. Testing was conducted at 23° C. and 18-25% relative humidity. 0.98N was used for load-cell performance check and the preload was 0.05N during testing. Flat grips were used with a grip pressure of 30 psi and the distance between the two grips was 1.5 inches. The testing speed was 2 inches per minute. The data was collected when the membrane was stretched to its breaking point.

Example 1—Permanently Hydrophilic Membranes with Water as Immersing Agent During e-Beam Modification A permanently hydrophilic membrane with a bubble point at 20 psi (IPA, PMI) was made via triple slot casting using polyethersulfone and PEOX (Aquazol 500, Polymer Chemistry Innovations, Inc.) blended mixes, and then crosslinked by e-Beam irradiation after immersing with water.

Three mixes including one top, one middle, and one bottom were made according to formulations in Table 1. The formulations include polyethersulfone (Sumitomo PES 5200P), N-Methyl-2-pyrrolidone (NMP), triethylene glycol (TEG), and PEOX. All three mixes were tested, and the viscosity and cloud point data are further presented in Table 1. A triple slot die was used to cast the nascent membrane on a mylar support on top of a cast drum. The top mix flow rate was 2.8 L/hr, the middle mix flow rate was 33.7 L/hr, and the bottom mix flow rate was 5.6 L/hr. The nascent membrane was partially formed on the cast drum by controlling the air exposure conditions and drum temperature. It was solidified in the formation bath, and then extracted in hot water. The process conditions are in Table 2. The membranes are finally dried before performance testing. The cast membrane (RSG2701L) performances including flow time, bubble point, and breaking strain were tested, and the results are shown in Table 3.

TABLE 1

Mix Formulation for Membrane RSG2701L with Cloud Point and Viscosity Data

| Formulation | Top Mix | Middle Mix | Bottom Mix |
|---|---|---|---|
| PES (wt %) | 10.9 | 16.5 | 14.0 |
| PEOX (wt %) | 1.3 | 2.0 | 1.7 |
| NMP (wt %) | 30.1 | 29.2 | 29.6 |
| TEG (wt %) | 57.7 | 52.3 | 54.7 |
| Cloud Point (° C.) | 48.7 | 49.6 | 48.3 |
| Viscosity (cP) | 1495 | 10918 | 4739 |

Note:

Viscosity measurements were performed at 35° C. with a S62 spindle at 10 rpm using a Brookfield viscometer (LVDV-II + P).

TABLE 2

Casting Conditions for Membrane RSG2701L

| Dew (° C.) | Air flow rate (SCFM) | Air temp (° C.) | Line speed (fpm) | Drum temp (° C.) | Bath temp (° C.) | Extraction temp (° C.) |
|---|---|---|---|---|---|---|
| 8.0 | 6.0 | 35 | 17 | 59.2 | 65.6 | 40.6 |

The membrane RSG2701L was prewet by immersing it in water and then e-Beam modified at different doses. The E-Beam modified membranes were rinsed with methanol and then water, and finally dried before performance testing. The properties of the e-Beam modified membranes, including TOC, flow time, wet time, bubble point, and breaking strain are disclosed in Table 3. It is clear that e-Beam modification decreases TOC substantially, from around 40 to less than 6 µg C/cm$^2$ when the e-Beam dose is equal to or greater than 50 kGy. Of equal importance, a substantial decrease in flow time is also achieved when the membrane is modified with e-Beam. In addition, e-Beam modification does not impact bubble point, or breaking strain within the e-Beam dose range investigated here.

TABLE 3

| | | Performance of e-Beam modified membrane RSG2701L when water is used as the coating solution | | | |
|---|---|---|---|---|---|
| E-Beam dose (kGy) | TOC (µg ° C./ cm$^2$) | Flow time (sec/ 500 ml) | Dull side wet time (sec) | Bubble point (psi, Galwick) | Breaking strain (%) |
| 0 (as cast) | 41.5 | 150 | 0.4 | 16.3 | 41 |
| 25 | 13.7 | 119 | 0.7 | — | 40 |
| 50 | 5.9 | 101 | 3.1 | 16.7 | 46 |
| 75 | 5.3 | 95 | 3.4 | — | 41 |
| 100 | 5.0 | 90 | 3.2 | — | 42 |
| 150 | 3.9 | 86 | 3.4 | 16.7 | 40 |

—Data not available.

Example 2—Permanently Hydrophilic Membranes with N,N'-methylenebisacrylamide Solution as the Immersing Agent During e-Beam Modification A permanently hydrophilic membrane with a bubble point at 20 psi (IPA, PMI) was made via triple slot casting with PES and PEOX blended mixes, and then crosslinked by e-Beam radiation after prewetting with N,N'-methylenebisacrylamide (MBAm, MilliporeSigma catalogue number 146072) solution.

Instead of water, the membrane RSG2701L (as prepared in Example 1) was prewet in aqueous MBAm solutions of varying concentrations and then modified by exposure to an e-Beam dose of 50 kGy. MBAm is a crosslinking agent that can render hydrophilicity once crosslinked on the surface of membranes. The membranes' properties, including TOC, flow time, wet time, and breaking strain, were tested, and the results are displayed in Table 4. The incorporation of MBAm can significantly improve the wettability, while having almost no impact on TOC and breaking strain. When the MBAm concentration is below 0.4%, the impact on flow time is also small. The permanent hydrophilicity is demonstrated as shown in Table 8 of Example 4.

TABLE 4

| | | Performance of e-Beam modified membrane RSG2701L when MBAm aqueous solution is used as the coating solution | | | |
|---|---|---|---|---|---|
| E-Beam dose (kGy) | MBAm concentration (wt %) | TOC (µg ° C./ cm$^2$) | Flow time (sec/ 500 ml) | Dull side wet time (sec) | Breaking strain (%) |
| 0 (as cast) | NA | 41.5 | 150 | 0.4 | 41 |
| 50 | 0 | 5.6 | 100 | 3.1 | 38 |
| 50 | 0.2 | 7.6 | 115 | 1.5 | 40 |
| 50 | 0.4 | 7.2 | 121 | 0.8 | 35 |
| 50 | 0.6 | 5.3 | 129 | 0.9 | 35 |

Example 3—Permanently Hydrophilic Membranes with Sartomer 9035 Solution as the Immersing Agent During e-Beam Modification A permanently hydrophilic membrane with a bubble point at 32 psi (IPA, PMI) was made via triple slot casting with PES and PEOX blended mixes, and then crosslinked by e-Beam radiation after prewetting with Sartomer 9035 (SR9035, Arkema Group) solution.

A hydrophilic triple zone membrane (RSI2318P) with a bubble point of 32 psi (IPA, PMI) was prepared according to the process as described in Example 1. Tables 5 and 6 list the mix formulations and casting conditions for this membrane. After casting, the membrane (RSI2318P) was prewet in Sartomer 9035 (SR9035) solutions with varying concentrations and then modified by exposure to an e-Beam at dose of 50 kGy. The SR9035 solution improves membrane wettability, while having almost no impact on TOC. The membrane performance data are listed in Table 7.

TABLE 5

| | | | |
|---|---|---|---|
| Mix Formulation for Membrane RSI2318P with Cloud Point and Viscosity Data | | | |
| Formulation | Top Mix | Middle Mix | Bottom Mix |
| PES (wt %) | 13 | 17.5 | 14.5 |
| PEOX (wt %) | 1.3 | 1.75 | 1.45 |
| NMP (wt %) | 29.21 | 29.8 | 32.16 |
| TEG (wt %) | 56.49 | 50.95 | 51.89 |
| Cloud Point (° C.) | 47.6 | 54.1 | 60.5 |
| Viscosity (cP) | 3089 | 13047 | 3779 |

Note:
Viscosity measurements were performed at 35° C. with a S62 spindle at 10 rpm, using a Brookfield viscometer (LVDV-II + P).

TABLE 6

| | | | | | | |
|---|---|---|---|---|---|---|
| Casting Conditions for Membrane RSI2318P | | | | | | |
| Dew (° C.) | Air flow rate (SCFM) | Air temp (° C.) | Line speed (fpm) | Drum temp (° C.) | Bath temp (° C.) | Extraction temp (° C.) |
| 4.0 | 5.9 | 30.1 | 17 | 57 | 67.2 | 66.5 |

TABLE 7

| | | | | |
|---|---|---|---|---|
| Performance of e-Beam modified membrane RSI2318P, when SR9035 aqueous solution is used as the coating solution | | | | |
| E-Beam dose (kGy) | SR9035 concentration (wt %) | TOC (µg ° C./ cm$^2$) | Flow time (sec/ 500 ml) | Dull side wet time (sec) |
| 0 (as cast) | NA | 22.1 | 180 | 3.2 |
| 50 | 0 | 8.6 | 195 | 2.7 |
| 50 | 0.2 | 5.8 | 183 | 0.7 |
| 50 | 0.4 | 7.2 | 178 | 0.5 |
| 50 | 0.8 | 5.6 | 329 | 0.5 |

The concentration of Sartomer 9035 can negatively impact membrane flow when its concentration is 0.8 wt % or higher. However, the membranes demonstrate good hydrophilicity after e-Beam exposure and methanol and water rinse. The permanent hydrophilicity is demonstrated as shown in Table 8 of Example 4.

Example 4—Permanent Hydrophilicity Testing Using Methanol Extraction

To confirm whether the e-Beam modified membranes are permanently hydrophilic, the membranes post modification were Soxhlet extracted with methanol for 48 hrs. Table 8 includes the wet time before and after Soxhlet extraction in methanol for 48 hours. It is clear that membranes without e-Beam exposure lost hydrophilicity after methanol extraction, and showed>30 sec wet time. This is because the PEOX in the membrane is leached out during the methanol extraction. On the contrary, the e-Beam modified membranes retain their original hydrophilicity as indicated by the <4 sec wet times after methanol Soxhlet extraction. This demonstrates that the e-Beam modified membrane hydrophilicity is stable.

TABLE 8

| | | | Membrane Wet Time Before and After Soxhlet Extraction in Methanol for 48 hours | | |
|---|---|---|---|---|
| Membrane | Prewet solution | E-Beam dose (kGy) | Dull side wet time before Soxhlet Extraction (sec) | Dull side wet time after Soxhlet Extraction (sec) |
| RSI2701L (as cast) | NA | 0 | 0.4 | >30 |
| RSI2701L | Water | 50 | 2.9 | 3.5 |
| RSI2701L | 0.2 wt % MBAm | 50 | 1.3 | 0.7 |
| RSI2318P (as cast) | NA | 0 | 3.2 | >30 |
| RSI2318P | Water | 50 | 2.7 | 1.4 |
| RSI2318P | 0.2 wt % SR9035 | 50 | 0.7 | 0.8 |
| RSI2318P | 0.4 wt % SR9035 | 50 | 0.5 | 0.4 |

Although preferred embodiments have been depicted and described in detail herein, it will be apparent to those skilled in the relevant art that various modifications, additions, substitutions, and the like can be made without departing from the spirit of the present application and these are therefore considered to be within the scope of the present application as defined in the claims which follow.

What is claimed:

1. An unsupported, permanently hydrophilic porous filtration membrane comprising:
   a polymeric matrix material, wherein the polymeric matrix material is one or more polymers selected from the group consisting of polyamides, polyimides, polyether sulphones, polysulphones, polyaryl sulphones, cellulose esters, and polyetherimides, and
   an electron-beam cross-linked polyoxazoline hydrophilic additive blended throughout said matrix material, forming the permanently hydrophilic porous filtration membrane having an extractable total organic carbon content of less than 20 $\mu$gC/cm$^2$.

2. The permanently hydrophilic filtration membrane of claim 1, wherein the membrane is a microporous membrane.

3. The permanently hydrophilic filtration membrane of claim 1, wherein the membrane is an ultrafiltration membrane.

4. The permanently hydrophilic filtration membrane of claim 1, wherein the extractable total organic carbon of the permanently hydrophilic filtration membrane is less than 10 $\mu$g C/cm$^2$.

5. The permanently hydrophilic filtration membrane of claim 1, wherein the polyoxazoline is selected from the group consisting of poly (2-ethyl-2-oxazoline), poly (2-methyl-2-oxazoline), and poly (2-propyl-2-oxazoline).

6. The permanently hydrophilic filtration membrane of claim 5, wherein the polyoxazoline is poly (2-ethyl-2-oxazoline).

7. The permanently hydrophilic filtration membrane of claim 1, wherein the polyoxazoline is cross-linked by electron beam with a dose of from about 20 to 150 kGy.

8. The permanently hydrophilic filtration membrane of claim 1, wherein the membrane comprises polyether sulfone and poly (2-ethyl-2-oxazoline).

9. The permanently hydrophilic filtration membrane of claim 1, wherein the membrane is symmetric.

10. The permanently hydrophilic filtration membrane of claim 1, wherein the membrane is asymmetric.

11. The permanently hydrophilic filtration membrane of claim 1, wherein the membrane has a breaking strain of at least 20%.

12. The permanently hydrophilic filtration membrane of claim 1, wherein the membrane has a breaking strain of at least 25%.

13. The permanently hydrophilic filtration membrane of claim 1, wherein the membrane has one or more distinct zones.

14. The permanently hydrophilic filtration membrane of claim 13, wherein the membrane has three distinct zones.

15. The permanently hydrophilic filtration membrane of claim 1, wherein the membrane has a total thickness from about 65 to 300 $\mu$m.

16. The permanently hydrophilic filtration membrane of claim 1, wherein the membrane is pleated.

17. A filtration cartridge comprising:
   a housing; and
   the membrane of claim 1 positioned within the housing.

* * * * *